(12) United States Patent
Jones et al.

(10) Patent No.: US 8,406,470 B2
(45) Date of Patent: Mar. 26, 2013

(54) OBJECT DETECTION IN DEPTH IMAGES

(75) Inventors: Michael J. Jones, Belmont, MA (US);
Oncel Tuzel, Cambridge, MA (US);
Weiguang Si, Los Angeles, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 164 days.

(21) Appl. No.: 13/089,914

(22) Filed: Apr. 19, 2011

(65) Prior Publication Data

US 2012/0269384 A1    Oct. 25, 2012

(51) Int. Cl.
*G06K 9/00* (2006.01)
*G06K 9/34* (2006.01)

(52) U.S. Cl. ......... 382/103; 382/173; 382/190; 348/135

(58) Field of Classification Search .................. None
See application file for complete search history.

(56) References Cited

U.S. PATENT DOCUMENTS

| | | | | |
|---|---|---|---|---|
| 5,161,204 | A * | 11/1992 | Hutcheson et al. | 382/157 |
| 6,266,442 | B1 * | 7/2001 | Laumeyer et al. | 382/190 |
| 6,556,692 | B1 * | 4/2003 | Gavrila | 382/104 |
| 7,009,579 | B1 * | 3/2006 | Kondo et al. | 345/1.2 |
| 7,043,474 | B2 * | 5/2006 | Mojsilovic et al. | 1/1 |
| 7,200,266 | B2 * | 4/2007 | Ozer et al. | 382/173 |
| 7,257,236 | B2 * | 8/2007 | Yukhin et al. | 382/103 |
| 7,330,566 | B2 * | 2/2008 | Cutler | 382/103 |
| 7,418,113 | B2 * | 8/2008 | Porikli et al. | 382/103 |
| 7,474,775 | B2 * | 1/2009 | Abramoff et al. | 382/128 |
| 7,478,091 | B2 * | 1/2009 | Mojsilovic et al. | 1/1 |
| 7,486,253 | B2 * | 2/2009 | Kondo et al. | 345/1.2 |
| 7,526,101 | B2 * | 4/2009 | Avidan | 382/103 |
| 7,542,610 | B2 * | 6/2009 | Gokturk et al. | 382/209 |
| 2006/0170769 | A1 * | 8/2006 | Zhou | 348/143 |
| 2006/0257031 | A1 * | 11/2006 | Abramoff et al. | 382/224 |
| 2010/0166339 | A1 * | 7/2010 | Gokturk et al. | 382/305 |
| 2010/0322474 | A1 * | 12/2010 | Cheriyadat et al. | 382/103 |
| 2011/0194777 | A1 * | 8/2011 | Gokturk et al. | 382/209 |
| 2011/0280442 | A1 * | 11/2011 | Chen et al. | 382/103 |
| 2011/0280478 | A1 * | 11/2011 | Chen et al. | 382/165 |

OTHER PUBLICATIONS

Sho Ikemura, Real-Time Human Detection Using Relational Depth Similarity Features, Dept. of Computer Science, Chubu University, Matsumoto 1200, Kasugai, Aichi, 487-8501 Japan, 2010.

* cited by examiner

*Primary Examiner* — Manav Seth
(74) *Attorney, Agent, or Firm* — Gene Vinokur; Dirk Brinkman

(57) ABSTRACT

A method for detecting an object in a depth image includes determining a detection window covering a region in the depth image, wherein a location of the detection window is based on a location of a candidate pixel in the depth image, wherein a size of the detection window is based on a depth value of the candidate pixel and a size of the object. A foreground region in the detection window is segmented based on the depth value of the candidate pixel and the size of the object. A feature vector is determined based on depth values of the pixels in the foreground region and the feature vector is classified to detect the object.

20 Claims, 5 Drawing Sheets

100

OBJECT DETECTION IN DEPTH IMAGES

FIELD OF THE INVENTION

This invention relates generally to detecting an object in an image, and more particularly to detecting the object in a depth image.

BACKGROUND OF THE INVENTION

Object detection is related to computer vision and image processing applications that deals with detecting instances of semantic objects of a certain class (such as humans, buildings or cars) in digital images and videos. Object detection has applications in many areas of computer vision, including image retrieval, and video surveillance. However, conventional object detection methods have a number of problems.

For example, a major shortcoming of most conventional surveillance systems is a reliance on visible light cameras. Most methods for detecting objects work on visible light images or video and do not work at night without providing artificial light sources. However, such solutions can be expensive, and are not applicable for some surveillance applications.

Also, conventional methods for detecting objects in images include a scanning window approach. In those methods, a classifier "scans" every rectangular patch of a fixed, known size in the image. The classifier takes an image patch as an input image and outputs a binary result depending on whether the image patch includes the object, or not. To detect objects at larger scales, the input image is scaled-down to a smaller image and the classifier is scanned over the scaled-down image. The scaling is done repeatedly until the resized image is smaller than a size of the patch. However the scanning window approach is computationally complex.

Accordingly, there is a need in the art to address above problems.

SUMMARY OF THE INVENTION

It is an object of the subject invention to provide a method for detecting an object in a depth image, or a depth video.

It is further object of the invention to provide such a method that detects objects of a specific class, such as people or cars.

It is further object of the invention to provide such a method that does not require scanning a classifier over the depth image.

It is further object of the invention to provide such a method and a system that detects objects in the depth images in computationally efficient manner.

One advantage of the depth image is that the acquisition of the depth image may not require light. The depth image can be produced by a depth sensor, which, for each pixel in the depth image, determines an estimate of the distance from a depth sensor to a point in a scene corresponding to the pixel. There are various technologies that are used to construct depth sensors, and most of technologies do not require light. This gives depth sensors an advantage over regular video cameras for surveillance applications. However, a usage of depth sensors creates a need for new object detection method that can take advantage of the depth values at each pixel in the depth image.

Some embodiments of current invention are based on a realization that an approximate size of the object of a class in the depth image can be determined based on a size of a typical object of the class and the depth values of the pixels. Thus, for any pixel, a size of the detection window can be determined, and the classifier need only be applied to the detection window around the pixel. Accordingly, the scanning of the classifier can be avoided, and so that the efficiency of the method is improved.

The size of the detection window, as a function of a depth value, can be predetermined or computed during an operation of the depth sensor. For example, various sizes of the detection window can be stored in a lookup value, and can be retrieved from the lookup table using the depth values as keys. Accordingly, a calculation of the size of the detection window during the object detection can be avoided, and the efficiency of the object detection can be improved. Also, the sizes of the detection windows can be determined for various poses of the object corresponding to the poses used for training the classifier. Also, the sizes of the detection window can be determined based on a resolution of the depth sensor, and can be reused for different applications.

Furthermore, a segmentation of a foreground region within the detection window can be determined based on the depth value of the pixel within the detection object and the size of the object, e.g., a depth of the object. Thus, the detection of the object can be performed for this foreground region, which can be normalized to improve the efficiency and accuracy of the classifier. In addition, the segmentation using depth values yields a rough silhouette that can be used to compute a feature vector.

Moreover, if a number of pixels in the foreground region is less than a threshold, the foreground region can be classified as not including the object. Thus, the classifier can be applied only to "promising" regions, which further improve the efficiency of the method. Also, the classifier can be trained only for one training size of an input image to the classifier. The detection window and/or the foreground region can be resized to the training size of the classifier for the object detection.

Furthermore, when the depth image is part of a time sequence of depth images, e.g. a depth video, the depth values of the pixels in the foreground region can be modified with depth values of corresponding pixels from a temporally adjacent depth image. For example, for each detection window, a temporal volume of depth data can be determined and the feature vector can be computed based on the depth data, which can further improve reliability of the object detection.

Accordingly, one embodiment discloses a method for detecting an object in a depth image, including: determining a detection window covering a region in the depth image, wherein a location of the detection window is based on a location of a candidate pixel in the depth image, wherein a size of the detection window is based on a depth value of the candidate pixel and a size of the object; segmenting a foreground region in the detection window based on the depth value of the candidate pixel and the size of the object; classifying the foreground region as not including the object, if a number of pixels in the foreground region is less than a threshold; and otherwise resizing the foreground region based on a training size of a classifier; determining a feature vector based on depth values of the pixels in the foreground region; and classifying the feature vector to detect the object.

Another embodiment discloses a method for detecting an object in a depth image, including: selecting, for a candidate pixel, a size of a detection window as a function of a depth value of the candidate pixel; arranging the detection window in the depth image around a location of the candidate pixel; setting a depth value of a pixel in the detection window to NULL, if a difference between a depth value of the pixel and the depth value of the candidate pixel is greater than a depth threshold, wherein a value of the depth threshold is a function of the depth value of the candidate pixel and a depth of the object; classifying the detection window as not including the object, if a number of pixels in the detection window having a non-NULL value is less than a threshold; and otherwise subtracting the depth value of the candidate pixel from non-NULL depth values of pixels in the detection window; resizing the detection window based on a training size of a classifier; determining a feature vector based on depth values of the pixels in the detection window; and classifying the feature vector to detect the object.

Yet another embodiment discloses a system for detecting an object in a depth image. The system includes a depth sensor for acquiring the depth image; a memory storing a lookup table for retrieval a size of a detection window based on a depth value; a classifier for detecting the object in an input image, wherein the input image has a training size; and a processor for determining the input image to the classifier and for executing the classifier to detect the object in the input image, such that during an operation of the system, the input image includes a foreground region segmented within the detection window arranged aground a candidate pixel, wherein the size of the detection window is selected from the lookup table using a depth value of the candidate pixel.

DETAILED DESCRIPTION OF THE PREFERRED EMBODIMENT

Figure 1:
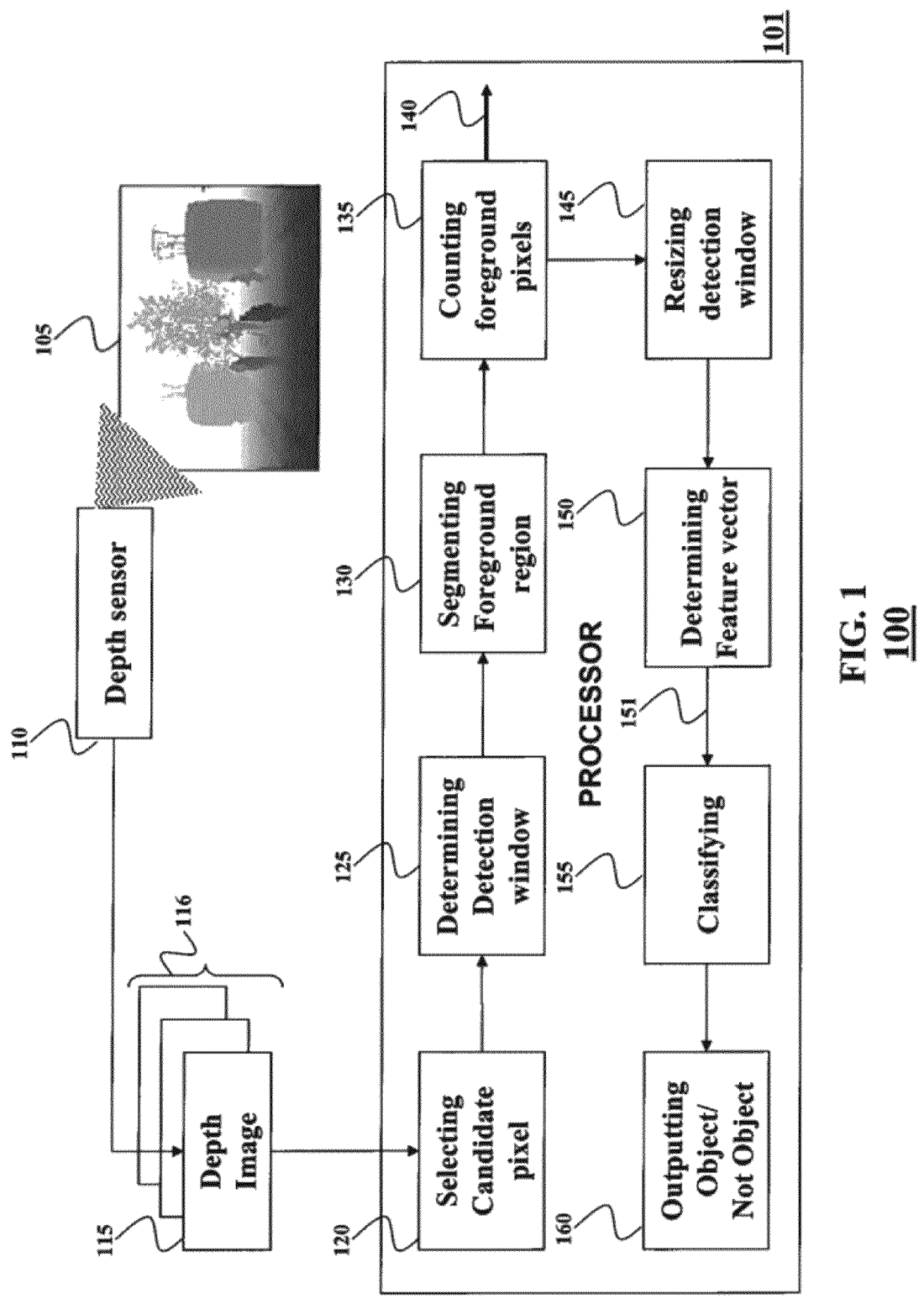
FIG. 1 is a block diagram of a method for detecting an object in a depth image according to some embodiments of invention.

FIG. 1 shows a block diagram of a method 100 for detecting an object in a depth image 115. The depth image of a scene 105 can be acquired by a depth sensor 110. The depth sensor can be any type of sensors configured to produce the depth image, such that each pixel in the depth image has a depth value indicative of a distance between the depth sensor and a corresponding object in the scene.

For example, light such as infrared (IR) light can be irradiated on an object, and a time of flight (TOF) is measured by sensing reflected light to measure a distance (depth value) from a depth sensor to each part of the object. The depth image 116 can be part of a time sequence of the depth images 116, e.g. a depth video. The method 100 can be implemented using a processor 101.

Figure 2:
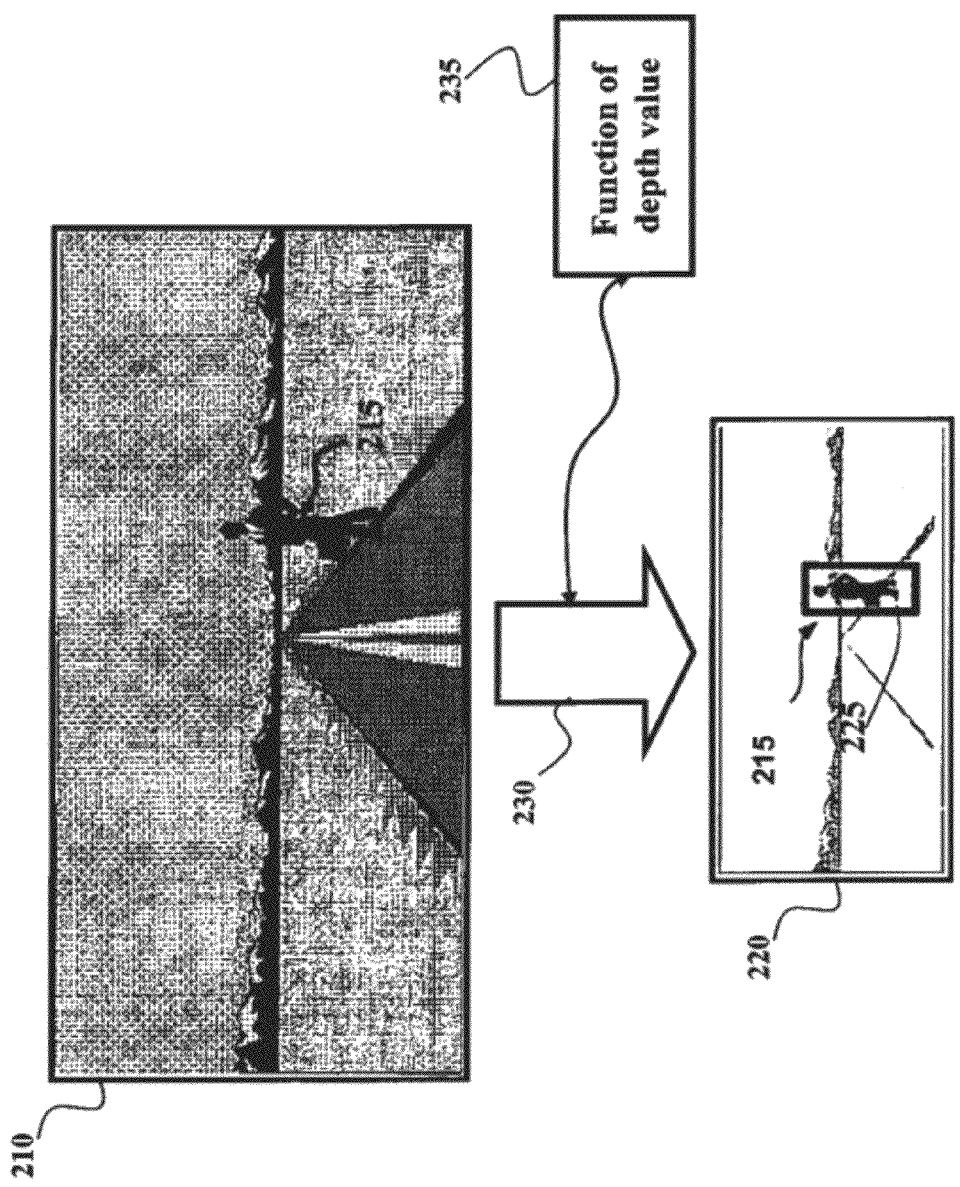
FIG. 2 is a schematic of determining a size of a detection window according one embodiment of the invention.

As shown in FIG. 2, the object to be detected in the depth image belongs to a specific class of objects, e.g., people, or cars. Some embodiments of the invention are based on a realization that for each candidate pixel of the depth image, a size of a detection window for detecting the object can be determined as a function of the depth value of the candidate pixels. This is because a size of the object is approximately known from the class of the object, and thus, the size of the detection window that can include the object can be determined based on the distance of the object from the depth sensor. The size of the object can include a length of the object, a width of the object, and a depth of the object.

For example, a scene 210 and a corresponding depth image 220 include, respectively, an object 215, i.e., a person, and an image of that object. The size of the detection window 225 can be determined 230 as a function 235 of the depth value of a candidate pixel associated with the object. The candidate pixel is selected from a set of candidate pixels, and analyzed, e.g., sequentially. In some embodiments, the set of candidate pixels includes all pixels of the depth image. In alternative embodiment, the set of candidate pixels is determined to include only foreground pixels of the depth image. Other variations are possible.

Figure 3:
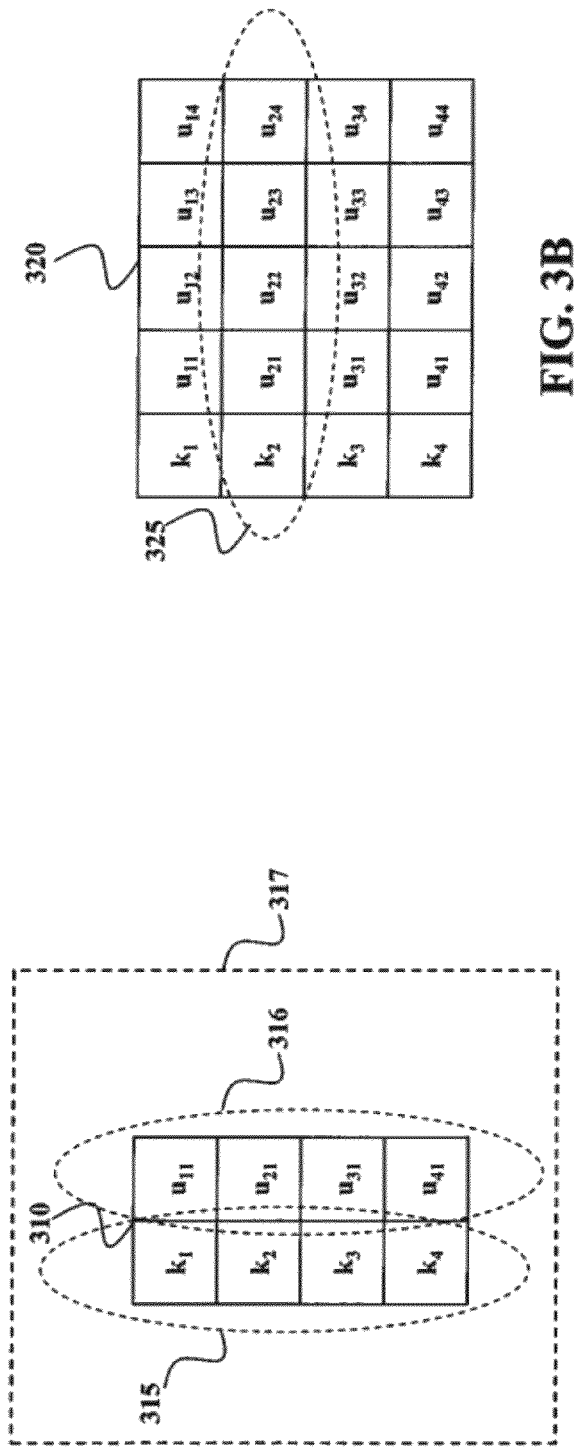
FIGS. 3A-3C are examples of lookup tables used by some embodiments of the invention.

As shown in FIG. 3A-3C, some embodiments of the invention use a lookup table for selecting the size of the detection window, such as lookup table 310, 320, and/or 330. The lookup table can be stored in a memory (not shown) operatively connected to the processor 101. The memory can be internal to the depth sensor 110, or can be a remote memory to be accessed, e.g., through an intranet or the Internet.

For example, the lookup table can include a lookup table 310, which provides a set of depth values 315 and a set of corresponding sizes 316 of the detection window, such that the depth value of the candidate pixel can be used as a key to select the size of the detection window. The lookup table can be stores in the memory 317.

The detection window can be of any arbitrary shape, e.g., a square, rectangular, or round. For example, the size of the detection window can include a length of the detection window and a width of the detection window, and each row of the lookup table, e.g., the lookup table 320, can include the corresponding data 325.

In some embodiments, the length of the detection window depends on the length of the object, and the width of the detection window depends on the width of the object. In one embodiment, the length and the width of the detection window depend on a pose of the object. The pose can be defined as the 3D translational location and angular orientation of the object.

For example, a classifier to detect the object can be trained for one or multiple poses. Also, the size of the detection window can depend on a resolution of the depth sensor. In various embodiments, the lookup table can be predetermined for specific type of the depth sensor, and shared across the depth sensor of this type, or can be determined during an operation of the depth sensor.

FIG. 3C shows an example of a lookup table 330, according to one embodiment of the invention. The lookup table includes values for depth values 331 of the pixels, resolutions 335 of the depth sensor(s), pose(s) 336 of the object and values of corresponding sizes of the detection windows, which can include values of length 332 of the detection window, values of width 333 of the detection window, and depth thresholds 334 of the detection window. The depth threshold 334 represents a depth of the object and can be used for segmentation, as described below.

Referring back to FIG. 1, after the size of the detection window is determined, the detection window is arranged in the depth image in a location selected based on a location of the candidate pixel in the depth image. For example, in one embodiment, the detection window is centered on the candidate pixel. Next, a foreground region in the detection window is segmented.

The segmenting 130 of the foreground image can be based on the depth value of the candidate pixel and the size, e.g., the depth, of the object. For example, one embodiment determines, for each pixel in the detection window, a difference between a depth value of the pixel and the depth value of the candidate pixel, and sets the depth value of the pixel to NULL, if the difference is greater than a depth of the object scaled based on a resolution of the depth image. For example, the difference can be compared with the depth threshold retrieved from the lookup table based on the depth value of the candidate pixel. If, for a pixel in the detection window, the difference is greater than the depth threshold, that pixel and the candidate pixel cannot both belong to the object to be detected. Thus, the pixel is not analyzed together with the candidate pixel.

In one embodiment, the foreground region can be preliminary classified 135 by counting a number of foreground pixels in the foreground region, i.e., the number of non-NULL pixels in the detection window. For example, if the number of pixels in the foreground region is less than a threshold, the foreground region is classified 140 as not including the object. One embodiment determines the threshold based on the size of the object and a noise statistic of the depth sensor.

Figure 4:
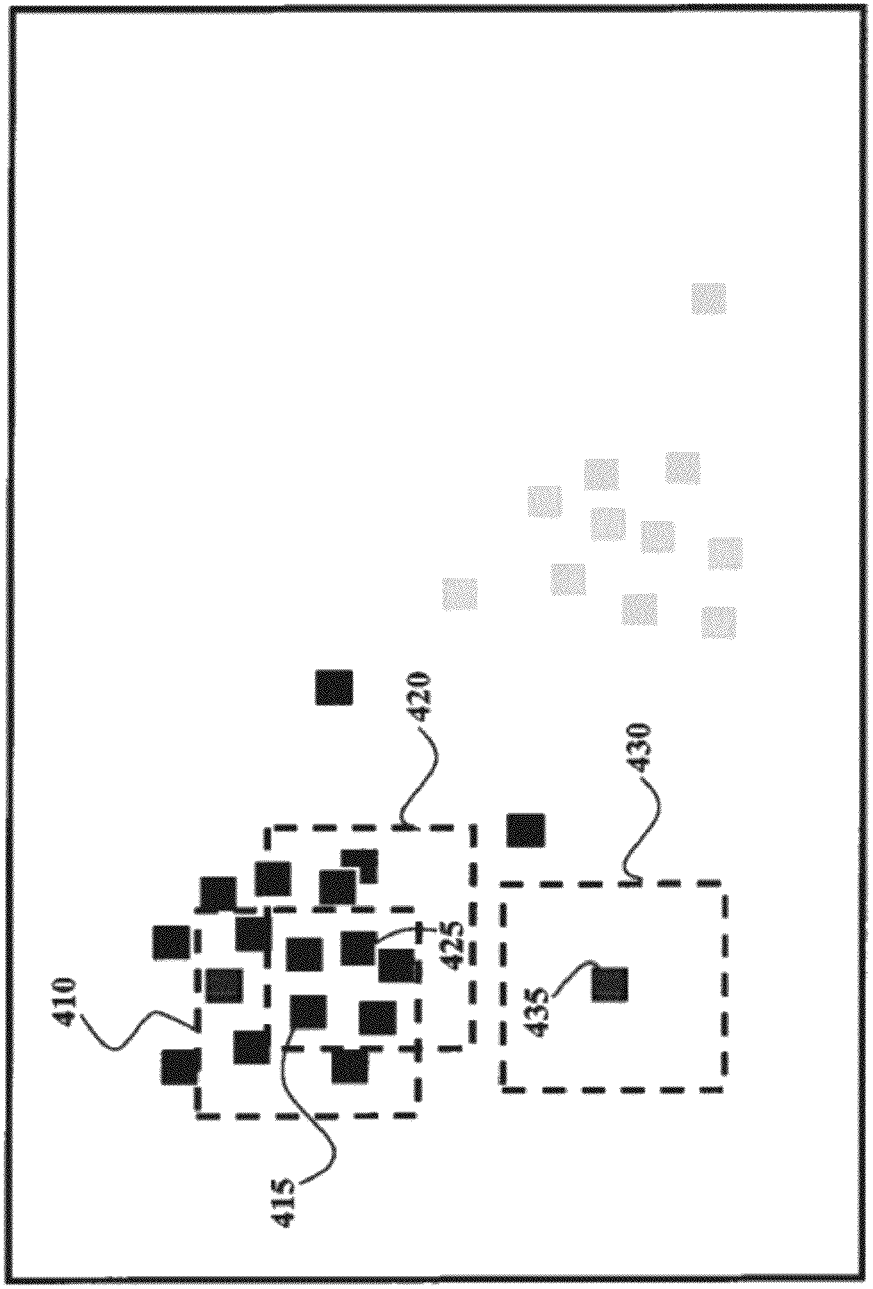
FIG. 4 is an example of a foreground region of the detection window in accordance with some embodiments.

For example, as shown in FIG. 4, a foreground region of a detection window 410 arranged around a candidate pixel 415 includes the number of pixels, i.e., nine pixels, which is greater than the threshold. Similarly, a foreground region of a detection window 420 arranged around a candidate pixel 425 includes the number of pixels, i.e., seven pixels, which also can be greater than the threshold. On the other hand, a foreground region of a detection window 430 arranged around a candidate pixel 435 include only one pixel, which can be less than the threshold, and thus, the detection window for this candidate pixel does not include the object.

Accordingly, the foreground region includes sufficient number of the pixels to potentially include the object, some embodiments normalizes the depth value of each non-NULL pixel to exclude dependency on a distance value of the candidate pixel. The normalization changes the depth value to a relative depth, which is invariant to the distance of the object from the depth sensor. For example, one embodiment subtracts the depth value of the candidate pixel from the depth value of the pixel. Another embodiment sets the depth value of each non-NULL pixel to one.

Some embodiments of the invention resize 145 the detection window and/or the foreground image based on a training size of the classifier. A classifier generally accepts only input images of a size one which the classifier is trained, i.e., a training size. The resizing can be done using various methods. For example, one embodiment uses bilinear interpolation to scale the detection window to the training size of the classifier. Other embodiments use, for example, subsampling and bicubic interpolation.

Next, a feature vector 155 for the detection window is determined 150. The feature vector is used as input to the classifier for classifying 155 the detection window as including/not including 160 the object. The feature vector can be determined, e.g., using Haar-like features, histogram-of-gradients (HoG) and/or local binary patterns (LBP). The classifier can be a binary classifier that outputs object/not object result, e.g., zero or one values, or a probability classifier that outputs a probability of the detection window including the object, e.g., a real number in a range [0, 1]. Types of the classifier include, but are not limited to, support vector machines (SVM), boosted decision trees, neural networks, and nearest neighbors classifiers.

The classifier can be trained using one of various machine learning techniques. If the depth sensor is stationary, then a background model can also be used to improve the foreground/background segmentation and also to reduce the number of the candidate pixels to apply the classifier. A background model can be acquired, or predetermined. Alternatively, the background model can be determined on-line during the operation of the depth sensor. For example, variations of values for each pixel are modeled when there is no foreground object present. The values of pixels can be modeled using a Gaussian distribution, or a sum of Gaussians distributions. When an object (such as a person) enters the scene, the pixels corresponding to the object do not conform to their expected values from the background model and can thus be identified as part of the foreground object. The background model can be used to determine the set of candidate pixels. Furthermore, values of the pixels corresponding to the background can be set to NULL to improve the segmentation.

In some embodiments, the depth image is part of a time sequence of the depth images, e.g. the depth video. One embodiment modifies the depth values of the pixels in the foreground region with depth values of corresponding pixels from a temporally adjacent depth image. For example, the depth values of the corresponding pixels can be subtracted from, or added to each other. Accordingly, for each detection window, a temporal volume of depth data can be determined and the feature vector can be computed based on the depth data, which can further improve reliability of the object detection.

For example, a multi-image descriptor can be determined using the temporal volume of depth data $\{I_t\}$, $t=t-\epsilon, \ldots, t+\epsilon$, wherein t represents time or an order of the depth image, and $\epsilon$ is a size of the temporal volume. The multi-image . . . descriptor represents the motion information or appearance change of the object through time. Accordingly, the feature vector can use a difference between depth images and/or motion flow.

For example, the difference encodes the pixel-wise distance between depth images. For example using the size of the temporal volume equals one, the feature vector corresponds to the difference images $\{I_t-I_{t-1}\}$. Similarly, the motion flow feature encodes the 3D motion of each pixel within the temporal volume of depth data. A flow vector, $F_t(x, y)$, encodes the motion of pixel with coordinated x, y from time t−1 to time t. The flow vector can be determined using, e.g., optical flow methods on the temporal volume of depth data. The final motion flow descriptor is given by all motion flow vectors within the temporal volume of depth data.

Figure 5:
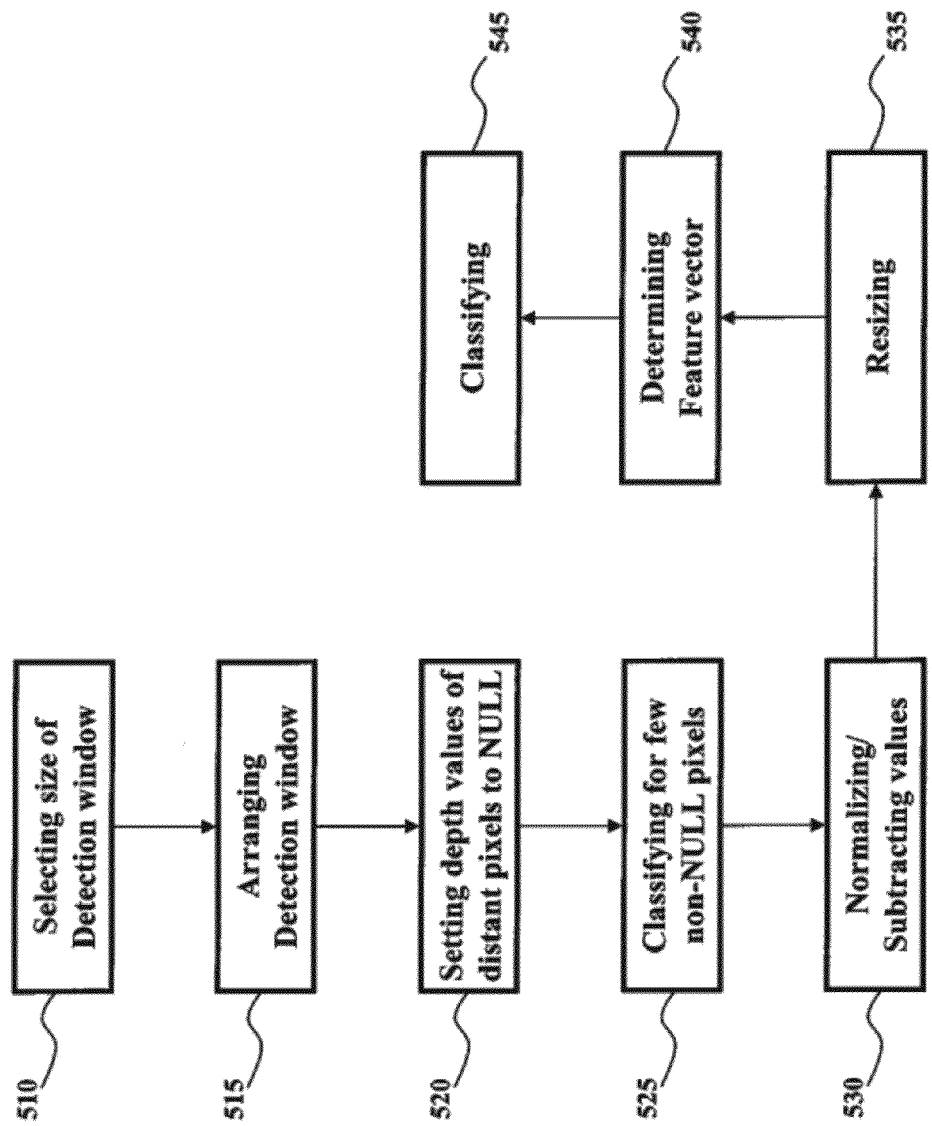
FIG. 5 is a flow chart of a method in accordance with one embodiment of the invention.

FIG. 5 shows a flow chart of a method for detecting an object in a depth image according to one embodiment of invention. A size of a detection window for a candidate pixel is selected 510 as a function of a depth value of the candidate pixel, and the detection window is arranged 515 in the depth image around a location of the candidate pixel. A depth value of a pixel in the detection window is set 520 to NULL, if a difference between a depth value of the pixel and the depth value of the candidate pixel is greater than a depth threshold. A value of the depth threshold is a function of the depth value of the candidate pixel and a depth of the object.

If a number of pixels in the detection window having a non-NULL value less than a threshold, the detection window is classified 525 as not including the object.

Otherwise, the depth value of the candidate pixel is subtracted 530 from non-NULL depth values of pixels in the detection window, and the detection window is resized 535 based on a training size of a classifier. A feature vector is determined 540 based on depth values of the pixels in the detection window and the feature vector is classified 545 to detect the object.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting an object in a depth image, comprising:
   determining a detection window covering a region in the depth image, wherein a location of the detection window is based on a location of a candidate pixel in the depth image, wherein a size of the detection window is based on a depth value of the candidate pixel and a size of the object;
   segmenting a foreground region in the detection window based on the depth value of the candidate pixel and the size of the object;
   classifying the foreground region as not including the object, if a number of pixels in the foreground region is less than a threshold; and otherwise
   resizing the foreground region based on a training size of a classifier;
   determining a feature vector based on depth values of the pixels in the foreground region; and
   classifying the feature vector to detect the object.

2. The method of claim 1, further comprising:
   selecting a set of candidate pixels; and
   repeating the determining the detection window, the segmenting, the resizing, determining the feature vector and the classifying for each candidate pixel in the set.

3. The method of claim 1, wherein the selecting comprises:
   determining foreground pixels in the depth image; and
   selecting the foreground pixels in the set of candidate pixels.

4. The method of claim 1, wherein the segmenting comprises:
   determining, for each pixel in the detection window, a difference between a depth value of the pixel and the depth value of the candidate pixel; and
   setting the depth value of the pixel to NULL, if the difference is greater than a depth of the object scaled based on a resolution of the depth image.

5. The method of claim 4, further comprising:
   setting the depth value of the pixel to one, if the difference is less or equal to the depth of the object scaled based on the resolution of the depth image.

6. The method of claim 4, further comprising:
   normalizing the depth value of the pixel, if the difference is less or equal to the depth of the object scaled based on the resolution of the depth image.

7. The method of claim 6, wherein the normalizing comprises:
   subtracting the depth value of the candidate pixel from the depth value of the pixel.

8. The method of claim 1, wherein the determining the detection window comprises:
   determining a length of the detection window based on a length of the object; and
   determining a width of the detection window based on a width of the object.

9. The method of claim 1, wherein the detection window is centered on the location of the candidate pixel.

10. The method of claim 1, wherein the determining the detection window comprises:
    selecting the size of the detection window from a lookup table using the depth value of the candidate pixel as a key.

11. The method of claim 10, further comprising:
    populating the lookup table based on the size of the object, a range of depth values from a sensor, and a resolution of the sensor.

12. The method of claim 11, further comprising:
    populating the lookup table based on a pose of the object.

13. The method of claim 1, further comprising:
    determining the threshold based on the size of the object and a noise statistic of a depth sensor.

14. The method of claim 1, further comprising:
    modifying the depth values of the pixels in the foreground region with depth values of corresponding pixels from a temporally adjacent depth image.

15. The method of claim 1, further comprising:
    determining the size of the object based on a class of the object, wherein the size includes a length of the object, a width of the object, and a depth of the object.

16. The method of claim 15, further comprising:
    training the classifier for the class of the object.

17. The method of claim 15, wherein the class of the object is selected from a group including at least one of people, and vehicles.

18. A method for detecting an object in a depth image, comprising:
    selecting, for a candidate pixel, a size of a detection window as a function of a depth value of the candidate pixel;
    arranging the detection window in the depth image around a location of the candidate pixel;
    setting a depth value of a pixel in the detection window to NULL, if a difference between a depth value of the pixel and the depth value of the candidate pixel is greater than a depth threshold, wherein a value of the depth threshold is a function of the depth value of the candidate pixel and a depth of the object;
    classifying the detection window as not including the object, if a number of pixels in the detection window having a non-NULL value is less than a threshold; and otherwise subtracting the depth value of the candidate pixel from non-NULL depth values of pixels in the detection window;

resizing the detection window based on a training size of a classifier;

determining a feature vector based on depth values of the pixels in the detection window; and classifying the feature vector to detect the object.

19. A system for detecting an object in a depth image, comprising:

a depth sensor for acquiring the depth image;

a memory storing a lookup table for retrieval a size of a detection window based on a depth value;

a classifier for detecting the object in an input image, wherein the input image has a training size; and a processor for determining the input image to the classifier and for executing the classifier to detect the object in the input image, such that during an operation of the system, the input image includes a foreground region segmented within the detection window arranged aground a candidate pixel, wherein the size of the detection window is selected from the lookup table using a depth value of the candidate pixel.

20. The system of claim 19, wherein the processor is further configured to normalize the depth values of pixels in the foreground region and to resize the foreground region based on the training size.

* * * * *